United States Patent Office 3,849,466
Patented Nov. 19, 1974

3,849,466
LONG CHAIN ALIPHATIC THIOLESTERS OF CYCLOPROPIONIC ACID
Clive A. Henrick and Gerardus B. Staal, Palo Alto, Calif., assignors to Zoecon Corporation, Palo Alto, Calif.
No Drawing. Filed Apr. 13, 1973, Ser. No. 350,952
Int. Cl. C07c 155/08
U.S. Cl. 260—455 R    4 Claims

ABSTRACT OF THE DISCLOSURE

Cyclopropanethioates of the formulas

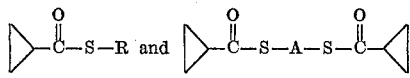

wherein R contains at least 10 carbon atoms and A is alkylene, alkenylene, or alkynylene compositions thereof for the control of mites.

---

This invention relates to novel compounds, synthesis thereof, compositions thereof and the control of mites.

The compounds of the present invention are effective for the control of spider mites. Spider mites are plant feeders and cause serious damage to orchard trees, field crops, greenhouse plants and other vegetation. They feed on the foliage or fruit of plants and trees and attack a variety of plants and trees due to their wide distribution. Mites of the family Tetranychidae, such as *Tetranychus urticae*, *Tetranychus atlanticus*, *Tetranychus bioculatus*, *Tetranychus canadensis*, *Tetranychus cinnabarinus*, *Tetranychus pacificus* and similar related species, are of particular biological interest and economic importance.

Compounds of the present invention of the following formulae A and B are effective control agents for mites.

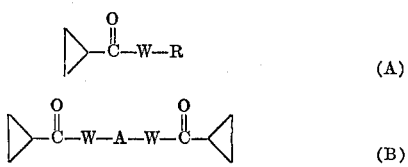

wherein,

W is —O— or —S—;
R is a monovalent organic radical of at least ten carbon atoms; and
A is alkylene, alkenylene or alkynylene.

Hereinafter, each of W, R and A is as defined above unless otherwise specified.

The compounds of formula A or B are applied to the mite at any stage, namely, during the egg, larvae, nymphal or adult stages in view of their effect in causing abnormal development leading to death, inability to pass from one stage to the next, or inability to reproduce. A compound of formula A, B or mixtures thereof, can be applied at dosage levels of the order of 0.001% to 1%. Suitable carrier substances include liquid or solid inert carriers, such as water, acetone, xylene, mineral or vegetable oils, talc, vermiculite, and silica. Treatment of mites in accordance with the present invention can be accomplished by spraying, dusting, or otherwise contacting the mites and/or their eggs or larvae directly or indirectly. Generally, a concentration of less than 25% of active compound is employed, although a higher concentration of the active compound can be used depending on the type of application apparatus. The formulations can include emulsifying agents and wetting agents to assist in the application and effectiveness of the active ingredient.

Typical esters and thiol esters of formula A are those wherein R is alkyl of ten to twenty-two carbon atoms; alkenyl of ten to twenty-two carbon atoms; or alkynyl of ten to twenty-two carbon atoms.

The esters of formulas A and B are prepared by the reaction of an acid halide, such as the acid chloride, of the formula

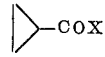

with an alcohol of the formula ROH neat or in an organic solvent inert to the reaction, such as a hydrocarbon or ether solvent. Usually an excess of the alcohol is employed and the reaction proceeds at room temperature satisfactorily, although higher or lower temperatures may be used. If the alcohol R-OH is sensitive to acid, the reaction can be done in the presence of pyridine at low temperature such as 0° C.

Similarly, the thiolesters of formula A and B can be prepared by the reaction of an acid halide

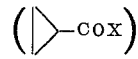

with a mercaptan of the formula RSH in an organic solvent inert to the reaction and usually in the presence of pyridine. Alyternatively, the thiolesters may be prepared by the reaction of the thiol acid of the formula

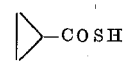

with a halide of the formula RX in an organic solvent inert to the reaction and in the presence of a base, for example, an alkali metal alkoxide or the like. Pyridine can be added if desired.

Suitable starting materials include 1-dodecanol, 1-tetradecanol, 1-octadecanol, 1-hexadecanol, 1-decanol, 9-octadecen-1-ol, 2-decyn-1-ol, 3-decyn-1-ol, 2-butyn-1,4-diol, n-dodecyl mercaptan, n-hexadecyl mercaptan, 1-undecanol, 1,4 - butanediol, 2-methyl-1,4-butanediol, 1,5-pentanediol 1,6-hexanediol, 3-methyl-1,5-pentanediol, 1,7-heptanediol, 1,8-octanediol and 1,10-decanediol.

The term "alkyl," as used herein refers to a straight or branched chain saturated aliphatic hydrocarbon group.

The term "alkenyl" as used herein refers to a straight or branched chain unsaturated carbon chain having one to three sites of olefinic unsaturation.

The term "alkynyl" as used herein refers to a straight or branched chain unsaturated carbon chain having one or two sites of acetylenic unsaturation.

The term "alkoxy" as used herein refers to methoxy, ethoxy, n-propoxy, i-propoxy, n-butoxy, i-butoxy, s-butyoxy, and t-butoxy.

The term "alkylene" refers to the bi-valent alkylene moiety, including branched-chain alkylene, of one to twenty carbon atoms.

The term "alkenylene" refers to the bi-valent alkenylene moiety, including branched-chain alkenylene, of two to twenty carbon atoms.

The term "alkynylene" refers to the bi-valent alkynylene moiety, including branched-chain alkynylene, of two to twenty carbon atoms.

The following examples are provided to illustrate the syntheses of the compounds of the present invention and the practice of the present invention. Temperature is reported in degrees centigrade.

To a stirred solution of 2.25 g. of cyclopropane carboxylic acid chloride in dry benzene, under nitrogen, is added 8 g. of 1-dodecanol. The mixture is stirred overnight and then diluted with pentane. The reaction mixture is worked up by washing with water and brine and then removing the solvent to yield dodecyl cyclopropanecarboxylate, b.p. 99–100° (bath) at 0.03 mm.

By using an equivalent amount of each of 1-tetradecanol, 1-octadecanol, 1-hexadecanol, and 1-decanol in the process of this example, there is prepared tetradecyl cyclopropanecarboxylate, b.p. 95.5° (bath) at 0.03 mm. octadecyl cyclopropanecarboxylate, m.p. 32°, hexadecyl cyclopropanecarboxylic, b.p. 154° (bath) at 0.05 mm., and decyl cyclopropanecarboxylate, b.p. 85° (bath) at 0.1 mm.

EXAMPLE 2

Following the procedure of Example 1, 9-octadecenyl cyclopropanecarboxylate, b.p. 159° (bath) at 0.05 mm. is prepared using 4.18 g. of cyclopropanecarboxylic acid chloride and 5.68 g. of 9-octadecen-1-ol in dry benzene.

EXAMPLE 3

To a solution of 3.85 g. of 2-decyn-1-ol and 3.95 g. of pyridine in 100 ml. ether is added 3.0 g. of cyclopropanecarboxylic acid chloride. The mixture is stirred overnight under nitrogen. The reaction mixture is poured into distilled water, washed with dilute hydrochloric acid and then with sodium bicarbonate and solvent removed to yield 2-decynyl cyclopropanecarboxylate, b.p. 96–97° (bath) at 0.1 mm.

Using the procedure of this Example, 3-decynyl cyclopropanecarboxylate, b.p. 78–80° (bath) at 0.01 mm. is prepared from 3.0 g. of cyclopropanecarboxylic acid chloride and 3.85 g. of 3-decyn-1-ol.

EXAMPLE 4

To a mixture of 3.0 g. of 1,4-butynediol, 150 ml. of dry diethyl ether, and 16.9 ml. of dry pyridine at 0°, under argon, is added 10.9 g. of cyclopropanecarboxylic acid chloride over a period of ten minutes. The mixture is stirred for two hours and then water and pentane are added. The mixture is washed with aqueous 3 N sulfuric acid, aqueous potassium carbonate, water, aqueous saturated cupric sulfate, water, and brine, dried over calcium sulfate and the solvent removed to yield the bis-cyclopropanecarboxylate of 1,4-butynediol, b.p. 108–111° (bath) at 0.05 mm.

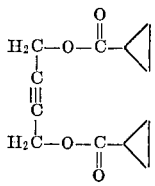

EXAMPLE 5

To a stirred solution of 4.16 g. of cyclopropanecarboxylic acid chloride in dry benzene containing 1.58 g. of pyridine, under nitrogen, is added 4.05 g. of n-dodecyl mercaptan. The mixture is washed with cupric sulfate, dried over calcium sulfate and alumina, filtered, and distilled to yield S-dodecyl cyclopropanethioate, b.p. 157° (bath) at 0.4 mm.

Using the procedure of this example, S-hexadecyl cyclopropanethioate, m.p. 26–28°, is prepared from 1.21 g. of cyclopropanecarboxylic acid chloride and n-hexadecyl mercaptan.

EXAMPLE 6

Using the procedure of Example 4, each of 1,12-dodecanediol, 1,10-decanediol, 1,7-heptanediol, 1,6-hexanediol, 1,8-octanediol and 1,4-butanediol is reacted with cyclopropanecarboxylic acid chloride to yield the respective bis-ester.

bis-cyclopropanecarboxylate of 1,12-dodecanediol
bis-cyclopropanecarboxylate of 1,10-decanediol
bis-cyclopropanecarboxylate of 1,7-heptanediol
bis-cyclopropanecarboxylate of 1,6-hexanediol
bis-cyclopropanecarboxylate of 1,8-octanediol
bis-cyclopropanecarboxylate of 1,4-butanediol The mite control agents of the present invention can be used alone in an inert agriculturally acceptable carrier substance for the control of mites (Acarina) or can be used in mixture with insecticides and/or juvenile hormone analogs known in the art to provide a broader spectrum of activity.

Adults (*Tetranychus urticae*) were allowed to oviposit for twenty-four hours on the underside of castor bean leaf discs (1 cm.) on moist cottonwool. After twenty-four hours, the adults were removed and the leaf discs were then dipped in acetone solution of hexadecyl cyclopropanecarboxylate (0.1% concentration). After submersion for one second, the solvent on the leaf discs is allowed to dry and the leaf discs are then glued to a plastic petri dish to prevent crumpling. Five days later each disc is observed for hatched and unhatched eggs. 100% of the eggs on the treated disc failed to hatch. 7% of the eggs on the control discs (treated with acetone only) failed to hatch.

What is claimed is:

1. A compound of the formulas A and B:

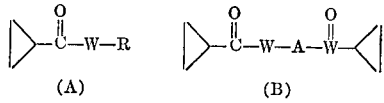

wherein,

W is —S—;

R is a monovalent aliphatic radical of at least 10 carbon atoms; and

A is alkylene, alkenylene or alkynylene.

2. A compound according to claim 1 of formula A wherein R is alkyl of 10 to 22 carbon atoms, alkenyl of 10 to 22 carbon atoms, alkynyl of 10 to 22 carbon atoms.

3. The compound, S-hexadecyl cyclopropanethioate, according to claim 2.

4. The compound S-(n-dodecyl)cyclopropanethioate, according to claim 2.

References Cited
UNITED STATES PATENTS 2,259,869  10/1941  Allen _____ 260—455 R
3,673,237   6/1972  Janiak _____ 260—455 R LEWIS GOTTS, Primary Examiner D. R. PHILLIPS, Assistant Examiner U.S. Cl. X.R.

260—468 H, 544 L; 424—301